A. BRIGHTMAN.
Bake-Pan.

No. 162,617.  Patented April 27, 1875.

Attest:  
Jos. S. Coombs  
Geo. W. Cushing jr

Inventor.  
Albert Brightman  
By James L. Norris,  
his atty.

THE GRAPHIC CO.PHOTO-LITH.39 & 41 PARK PLACE,N.Y.

UNITED STATES PATENT OFFICE.

ALBERT BRIGHTMAN, OF NEW BEDFORD, MASSACHUSETTS, ASSIGNOR OF ONE-HALF HIS RIGHT TO JOSIAH S. BONNEY, OF SAME PLACE.

IMPROVEMENT IN BAKE-PANS.

Specification forming part of Letters Patent No. 162,617, dated April 27, 1875; application filed April 9, 1875.

*To all whom it may concern:*

Be it known that I, ALBERT BRIGHTMAN, of New Bedford, in the county of Bristol and State of Massachusetts, have invented certain new and useful Improvements in Pans for Domestic Purposes, of which the following is a specification:

This invention relates to pans used for baking bread, meats, and other articles of food; and the object of the present improvements is to furnish a baking-pan which is provided with means whereby the bottom of the pan may be elevated from the stove in order to prevent the same from becoming heated to such a degree as to burn the contents, and whereby the latter may be effectually and thoroughly baked or cooked without liability of burning, as the heat transmitted to the pan from the stove can be regulated as required whenever the pan becomes too hot by reason of its contact with the stove.

To this particular end my invention consists in providing the ordinary or any preferred form of baking-pan, with handles which are so constructed and connected with the pan that they are capable of being turned on their axis or pivot in order to cause them to project down below the bottom of the pan, and thereby be converted into feet for the latter, so that it can be elevated in order to support it above the stove, whereby the heat transmitted to the bottom of the said pan can be regulated as desired to prevent the articles being cooked from burning, to overcome which has heretofore been a source of much trouble and occasions great annoyance, and which has only been partially accomplished by the employment in the stove of one or more racks on which the pans are placed to elevate them from the stove.

Figure 1:
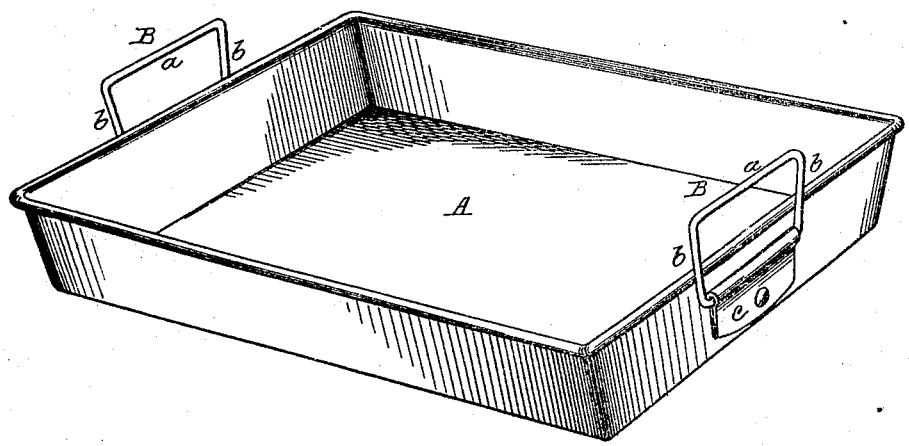
Figure 2:
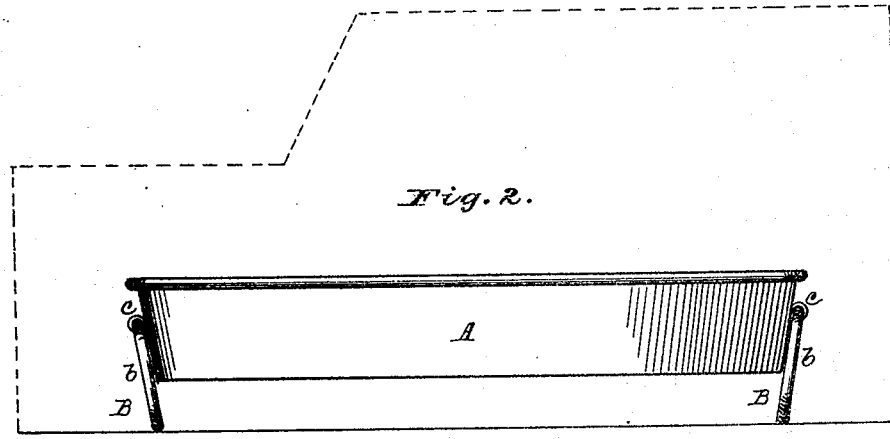

In the accompanying drawings, Figure 1 is a perspective view of a pan with my improvement applied. Fig. 2 is a side elevation of the same, showing the handles turned down for supporting the pan in an elevated position.

The pan A may be of any preferred or ordinary construction employed for baking bread, meat, and other articles of food, and the handles B may be of circular, rectangular, square, or other polygonal shape to accomplish the purpose for which they are designed. They are, in the present example, shown as constructed of wire bent so as to produce a broad or lengthened bearing, *a*, and arms *b b*, which are connected with the walls of the pan by means of eyes or loops *c c*, soldered, riveted, or otherwise attached to the pan. The length of the handles from the point where they are attached to the wall of the pan to their upper or top portions is such that, when turned in the loops or eyes *c* in a downward direction, their upper or bearing surfaces *a* will project below the bottom of the pan, and by this means be converted into feet upon which the pan can rest in order to support the same above the surface of the stove. By this means the pan can be caused to rest in contact with the stove, or when its bottom becomes heated to such an extent that the articles being baked are liable to burn, they can be turned down and converted into feet, and the pan may be supported in an elevated position, so as to be out of direct contact with the stove, and thereby the articles are uniformly heated, thoroughly and effectually baked or cooked, and the burning of the same at the bottom of the pan effectually prevented, thus overcoming much annoyance heretofore present in cooking or baking bread and other articles of food.

Having thus described my invention, what I claim is—

A baking-pan provided with handles constructed to be converted into feet for the pan, whereby the latter may be supported by said handles in an elevated position above the stove, substantially as and for the purpose described.

In testimony that I claim the foregoing I have hereunto set my hand.

ALBERT BRIGHTMAN.

Witnesses:
JOSIAH S. BONNY,
WM. H. TAYLOR.